(12) United States Patent
Prabhakar et al.

(10) Patent No.: US 7,428,304 B2
(45) Date of Patent: Sep. 23, 2008

(54) METHOD AND APPARATUS FOR DETECTING SUBSCRIBER ALERTING SIGNAL TONES AND CUSTOMER PREMISES EQUIPMENT ALERTING SIGNAL TONES TO NON-ECHO CANCELING MODEMS

(75) Inventors: Sheela Prabhakar, Bangalore (IN); Gopinath Patra, Bangalore (IN); Narasimha Pai, Bangalore (IN)

(73) Assignee: Silicon Laboratories, Austin, TX (US)

( * ) Notice: Subject to any disclaimer, the term of this patent is extended or adjusted under 35 U.S.C. 154(b) by 521 days.

(21) Appl. No.: 10/930,092

(22) Filed: Aug. 31, 2004

(65) Prior Publication Data

US 2006/0067509 A1    Mar. 30, 2006

(51) Int. Cl.
*H04M 9/08* (2006.01)
*H04B 1/38* (2006.01)
*H04L 5/16* (2006.01)

(52) U.S. Cl. .............................. 379/406.01; 379/406.02; 379/406.03; 379/406.08; 375/222

(58) Field of Classification Search ............ 379/373.01; 375/222

See application file for complete search history.

(56) References Cited

U.S. PATENT DOCUMENTS

| 4,609,787 | A  | * | 9/1986  | Horna ................... 379/406.08 |
| 5,602,869 | A  | * | 2/1997  | Scott ........................... 375/222 |
| 5,974,138 | A  | * | 10/1999 | Sambhwani et al. ... 379/373.01 |
| 6,269,160 | B1 | * | 7/2001  | Bartkowiak ................. 379/386 |
| 6,498,848 | B1 | * | 12/2002 | Sandre ................... 379/373.01 |
| 6,594,360 | B1 | * | 7/2003  | Gazsi et al. ............ 379/406.08 |
| 6,704,415 | B1 | * | 3/2004  | Katayama et al. ...... 379/406.01 |

* cited by examiner

*Primary Examiner*—Ramnandan Singh
(74) *Attorney, Agent, or Firm*—Anthony P. Ng; Dillon & Yudell LLP

(57) ABSTRACT

A non-echo canceling voice band modem capable of detecting subscriber alerting signal (SAS) tones and customer premises equipment alerting signal (CAS) tones is provided. The modem includes a shaping filter, an analog-to-digital converter (ADC), a SAS tone detector, a CAS tone detector and an echo canceler. The shaping filter, which is located in a transmitting path of the modem, filters modem signals to be transmitted from the modem. The ADC, which is located in a receiving path of the modem, converts any incoming analog signal to corresponding digital signals to be used by the modem. The echo canceler, which is coupled to the SAS and CAS tone detectors, cancels any echoes in modem signals before sending said modem signals to the SAS and CAS tone detectors.

24 Claims, 2 Drawing Sheets

METHOD AND APPARATUS FOR DETECTING SUBSCRIBER ALERTING SIGNAL TONES AND CUSTOMER PREMISES EQUIPMENT ALERTING SIGNAL TONES TO NON-ECHO CANCELING MODEMS

BACKGROUND OF THE INVENTION

1. Technical Field

The present invention relates to modems in general, and in particular to non-echo cancelling voice band modems. Still more particularly, the present invention relates to a method and apparatus for detecting subscriber alerting signal tones and customer premises equipment alerting signal tones in a non-echo canceling voice band modem.

2. Description of Related Art

If a telephone user is a subscriber to the call-waiting service, the telephone user will receive an audible tone of certain frequency and cadence on a telephone to inform the telephone user of an incoming call while the user is already attending a call on the telephone. If the telephone user is also a subscriber to the caller identification on call waiting (CIDCW) service, the telephone user will receive a Caller ID of the incoming call in conjunction with the audible tone to inform the telephone user the identity of the caller of the incoming call. The audible tone associated with the call-waiting service is implemented by subscriber alerting signals (SASs) or commonly known as call-waiting signals. Each Caller ID associated with the CIDCW service is preceded by a customer premises equipment alerting signal (CAS).

SAS signals are different for different countries. In the United States of America, SAS signals are single tone signals having a frequency of 440 Hz. On the other hand, CAS signals are dual-tone signals having frequencies 2,130 Hz and 2,750 Hz. Both SAS and CAS signals need to be detected in order to take advantage of the call-waiting service and the CIDCW service, respectively.

For non-echo canceling modems, the detections of SAS and CAS signal tones have to be performed in the presence of echoes of transmitted signals. Such operating environment deteriorates modem performance, especially when the modem has to comply with rigorous standards such as TIA/EIA-777. Consequently, it would be desirable to provide an improved method and apparatus for detecting SAS and CAS signal tones in non-echo canceling modems.

SUMMARY OF THE INVENTION

In accordance with a preferred embodiment of the present invention, a non-echo canceling voice band modem capable of detecting subscriber alerting signal (SAS) tones and customer premises equipment alerting signal (CAS) tones includes a shaping filter, an analog-to-digital converter (ADC), a SAS tone detector, a CAS tone detector and an echo canceler. The shaping filter, which is located in a transmitting path of the modem, filters modem signals to be transmitted from the modem. The ADC, which is located in a receiving path of the modem, converts any incoming analog signal to corresponding digital signals to be used by the modem. The echo canceler, which is coupled to the SAS and CAS tone detectors, cancels any echoes in modem signals before sending said modem signals to the SAS and CAS tone detectors.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
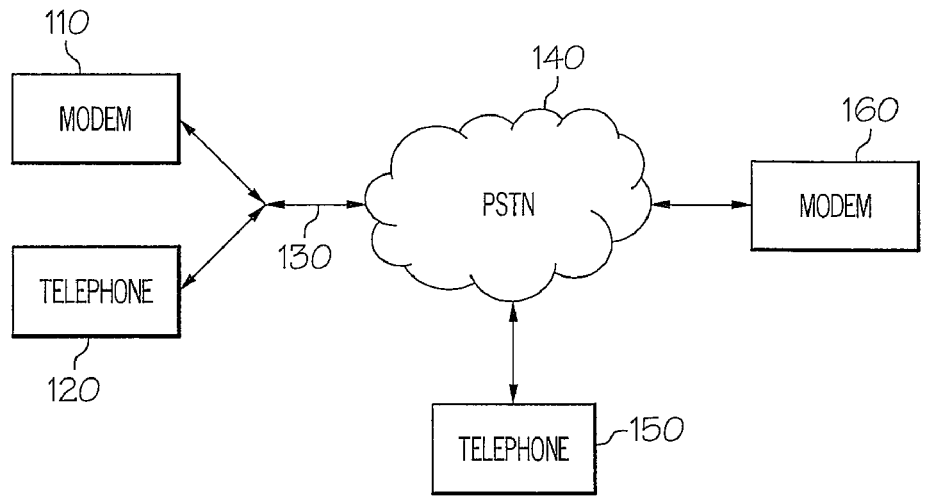
FIG. 1 is a block diagram of a modem communication configuration in which a preferred embodiment of the present invention is incorporated.

Referring now to the drawings and in particular to FIG. 1, there is depicted a block diagram of a modem communication configuration in which a preferred embodiment of the present invention is incorporated. As shown, a modem 110 is connected to a modem 160 via a public switched telephone network (PSTN) 140. Each of modems 110 and 160 can be a software modem, a hardware modem or a server side modem. Modem 110 preferably operates in one of the split-band modem standards, such as the ITU-T Recommendation V.22 bis, V.22 or V.21 or Bell standards BELL103 or BELL212A. Modem 110 is a non-echo cancelling modem provided with call-waiting and caller identification on call waiting (CIDCW) features. Modem 110 is connected to PSTN 140 through a line 130. Similarly, a telephone 120 is also connected to PSTN 140 through line 130. Thus, both modem 110 and telephone 120 share line 130 for the connection to PSTN 140.

During data communications between modem 110 and modem 160, a caller may initiate a call from a telephone 150 to the number associated with telephone 120 (or line 130 specifically). PSTN 140 then supplies a subscriber alerting signal tone (or commonly known as the call-waiting tone) and the Caller ID on call waiting on line 130. If a user accepts the telephone call after finding out the identity of the caller, the central office then couples telephone 120 to line 130. Modem 160 is subsequently put on hold if modem 160 supports modem-on-hold features; otherwise, modem 160 is disconnected. After the user on telephone 120 finishes the conversation with the caller on telephone 150, modem 110 is then reconnect back to modem 160 using the modem-on-hold features.

Figure 2:
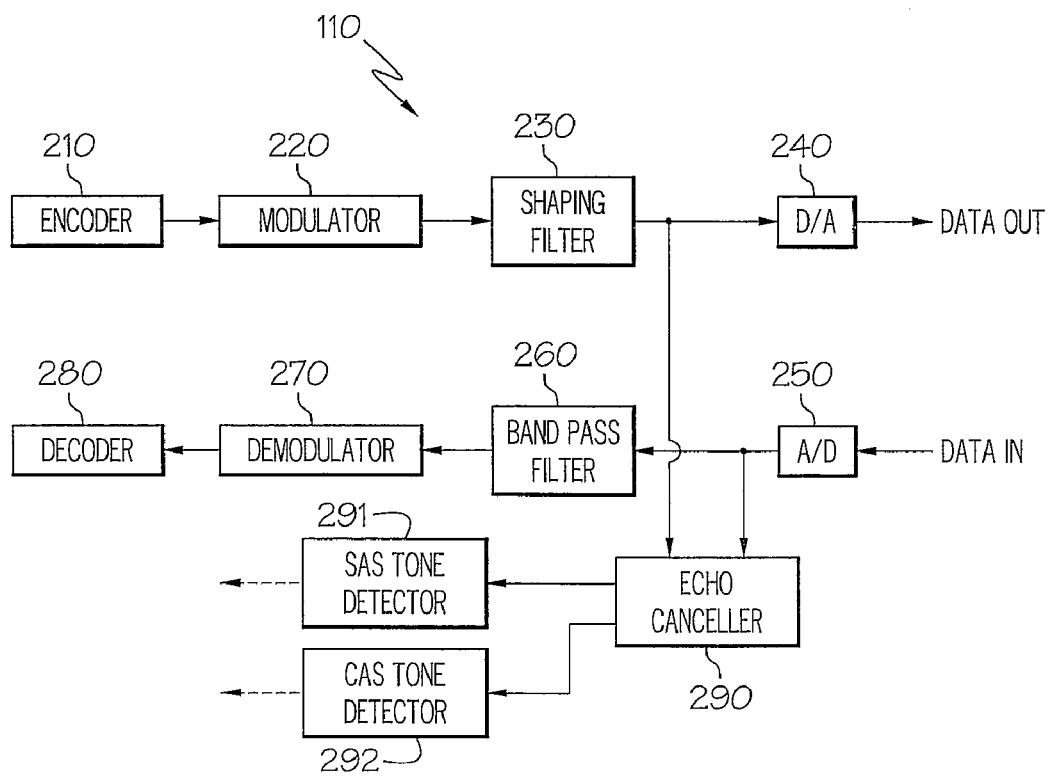
FIG. 2 is a detailed block diagram of a modem within the modem communication configuration from FIG. 1, in accordance with a preferred embodiment of the present invention.

With reference now to FIG. 2, there is depicted a detailed block diagram of modem 110, in accordance with a preferred embodiment of the present invention. As shown, modem 110 includes an encoder 210, a modulator 220, a shaping filter 230 and a digital-to-analog converter (DAC) 240. Encoder 210, modulator 220, shaping filter 230 and DAC 240 are in the transmitting path of modem 110 for processing modem signals to be transmitted from modem 110. Modem 110 also includes an analog-to-digital converter (ADC) 250, a band-pass filter 260, a demodulator 270 and a decoder 280. ADC 250, band-pass filter 260, demodulator 270 and decoder 280 are in the receiving path of modem 110 for processing incoming analog signals received by modem 110.

In addition, modem 110 includes an echo canceler 290 for cancelling echoes of the modem signals within modem 110.

Echo canceler 290 receives signals from the output of shaping filter 230 and signals from the output of ADC 250. In turn, echo canceler 290 sends the above-mentioned signals to a subscriber alerting signal (SAS) tone detector 291 and a customer premises equipment alerting signal (CAS) tone detector 292.

Figure 3B:
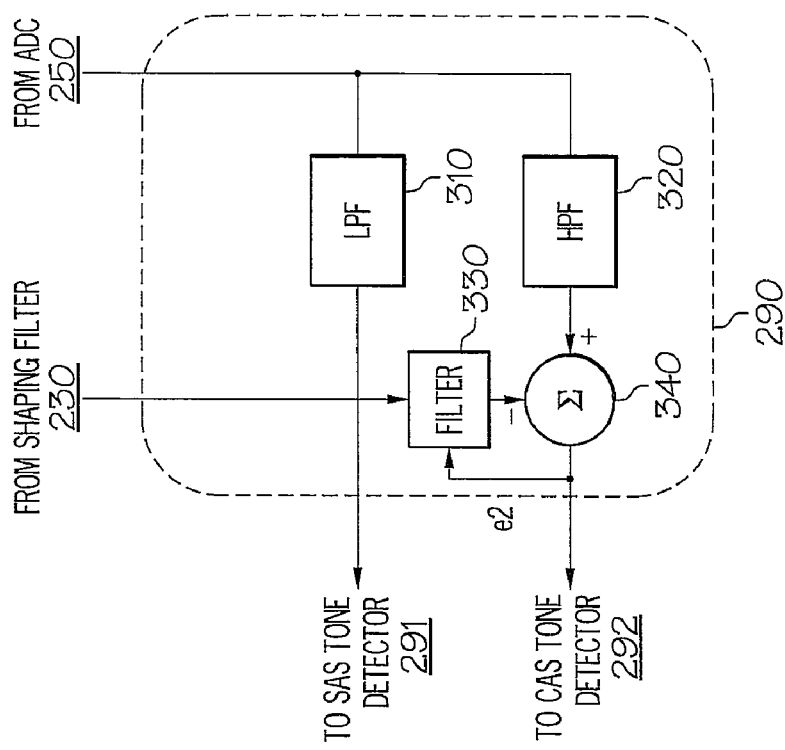
FIGS. 3A–3B are detailed block diagrams of an echo canceler within the modem from FIG. 2, in accordance with a preferred embodiment of the present invention.
Figure 3A:
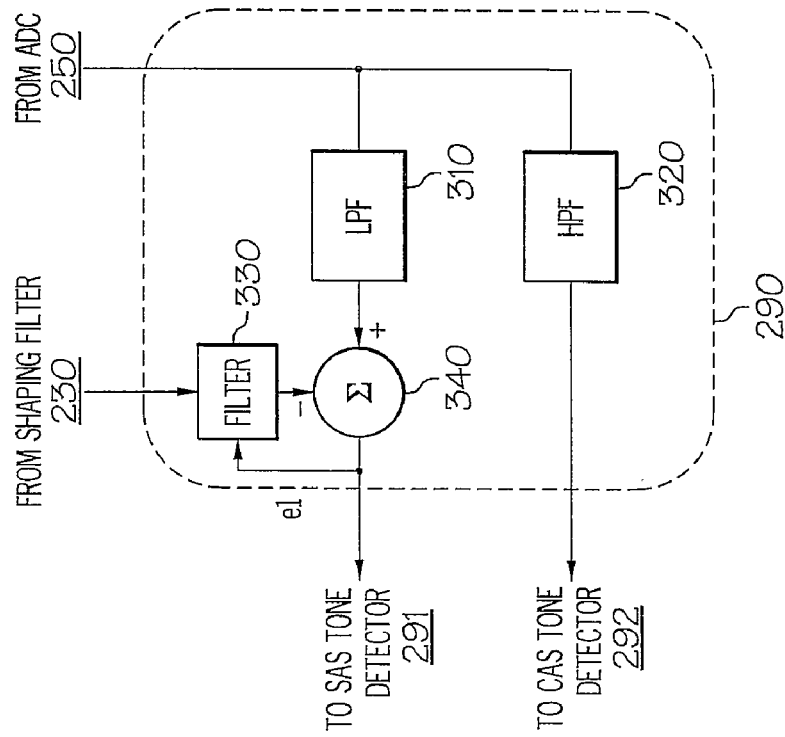

There are two modes of operation for modem 110, namely, an originate (or calling) mode and an answer mode. In the originate mode, modem 110 initiates a call; in the answer mode, modem 110 receives a call. Referring now to FIGS. 3A–3B, there are depicted two detailed block diagrams of echo canceler 290, in accordance with a preferred embodiment of the present invention. FIG. 3A depicts the operations of echo canceler 290 when modem 110 is operating in the originate mode. FIG. 3B depicts the operations of echo canceler 290 when modem 110 is operating in the answer mode. As shown, in both operating situations, echo canceler 290 includes an low-pass filter 310, a high-pass filter 320, an adaptive filter 330 and a summing circuit 340. Because the SAS tone frequency is assumed to be less than 1,700 Hz, low-pass filter 310 has a cut-off frequency of approximately 1,700 Hz, and high-pass filter 320 has a cut-off frequency of approximately 1,900 Hz. The spectrum of transmitted signal lies within a band of 1200±500 Hz, and the spectrum of received signal lies within a band of 2400±500 Hz for an originate modem. For an answer modem, the spectrum of transmitted signal lies within a band of 2400±500 Hz, and the spectrum of received signal lies within a band of 1200±500 Hz.

When modem 110 operates in the originate mode, as shown in FIG. 3A, the received signal and transmit echo within modem 110 are separated by passing the output of ADC 250 through low-pass filter 310 and high-pass filter 320 within echo canceler 290. The output of shaping filter 230 is sent to adaptive filter 330 as a reference input. The output of adaptive filter 330, which is an estimate of the transmit echo, is sent to summing circuit 340. The output of low-pass filter 310 is the actual transmit echo received by modem 110 and is also sent to summing circuit 340. In turn, summing circuit 340 yields an error signal e1 by determining the difference between the actual transmit echo received from low-pass filter 310 and the estimated transmit echo received from adaptive filter 330.

Adaptive filter 330 needs to be trained in order to estimate transmit echoes within modem 110. Specifically, adaptive filter 330 needs to be trained to learn the echo path before adaptive filter 330 can be used to cancel any echo in transmit signals within modem 110. The error signal e1 is used to train the coefficients of adaptive filter 330 using the least-mean-square algorithm. After entering a data mode, the training of adaptive filter 330 preferably lasts approximately 1.5 seconds and then stop. The training should be performed only on the echo of modem 110. Hence, filters 310 or 320 are utilized to separate out the echo of modem 110 from the signals received from the line.

The length of adaptive filter 330 is kept to a minimum, since only near end echoes needed to be cancelled. Near end echoes are the echoes from modem 110's own 4-to-2 wire converter. The central office blocks all signals to and from the far end during transmission of the SAS and CAS, thus removing the far-end echo path. The length of adaptive filter 330 should be decided based on the delay in the near end echo only and should not be long enough to learn the far end echo path. In fact, an increase in the length of adaptive filter 330 may deteriorate the performance of echo canceler 290 due to cancellation of far end echo estimates that no longer exist.

The output of summing circuit 340 is sent to the SAS tone detector 291. SAS tones can be detected by SAS tone detector 291 in the presence of a very low residual echo. The output of high-pass filter 320 is sent to CAS tone detector 292. Hence, the respective inputs to SAS tone detector 291 and CAS tone detector 292 should be free of echoes of the transmitted signals, which allow detections of clear SAS and CAS tones.

When modem 110 operates in the answer mode as a non-initiator of a call, as shown in FIG. 3B, the lower frequency SAS is obtained at the output of low-pass filter 310. The output of shaping filter 230 is sent to adaptive filter 330 as a reference input. The output of adaptive filter 330, which is an estimate of the transmit echo, is sent to summing circuit 340. The output of high-pass filter 320 is the actual transmit echo received by modem 110 and is also sent to summing circuit 340. In turn, summing circuit 340 yields an error signal e2 by determining the difference between the actual echo received from high-pass filter 320 and the estimated echo received from adaptive filter 330.

Similar to the scenario of FIG. 3A, error signal e2 is subsequently utilized to train the coefficients of adaptive filter 330. The output of summing circuit 340 is also sent to CAS tone detector 292. The signal obtained from low-pass filter 310 is fed to SAS tone detector 291. As a result, both CAS and SAS tones can be clearly detected by CAS tone detector 292 and SAS tone detector 291, respectively.

As has been described, the present invention provides an improved method and apparatus for detecting SAS and CAS tones in a non-echo canceling voice band modem. The method and apparatus of the present invention allow the procedure of CAS detection to pass the tests given under the TIA/EIA-777 standards. The method and apparatus of the present invention also allow clear SAS tone detection, even if the SAS tone frequency lies within the spectrum of signals to be transmitted from a modem.

It is also important to note that although the present invention has been described in a hardware context, those skilled in the art will appreciate that the method of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A non-echo canceling voice band modem capable of detecting subscriber alerting signal (SAS) tones and customer premises equipment alerting signal (CAS) tones, said modem comprising:

a shaping filter in a transmitting path of said modem for filtering signals to be transmitted from said modem;

an analog-to-digital converter (ADC) in a receiving path of said modem for converting incoming signals;

a SAS tone detector;

a CAS tone detector; and an echo canceler coupled to said SAS and CAS tone detectors, wherein said echo canceler cancels echoes in modem signals before sending said modem signals to said SAS and CAS tone detectors, wherein said echo canceler includes a high-pass filter, a low-pass filter, an adaptive filter and a summing circuit, wherein said adaptive filter and said summing circuit are utilized in conjunction with said low-pass filter to provide a first error signal for said SAS tone detector when said modem is operating in an originate mode.

2. The modem of claim 1, wherein said first error signal is utilized to train said adaptive filter when said modem is operating in said originate mode.

3. The modem of claim 1, wherein said adaptive filter and said summing circuit are utilized in conjunction with said high-pass filter to provide a second error signal for said CAS tone detector when said modem is operating in an answer mode.

4. The modem of claim 3, wherein said second error signal is utilized to train said adaptive filter when said modem is operating in said answer mode.

5. The modem of claim 1, wherein said low-pass filter has a cut-off frequency at approximately 1,700 Hz.

6. The modem of claim 1, wherein said high-pass filter has a cut-off frequency at approximately 1,900 Hz.

7. The modem of claim 1, wherein said transmitting path of said modem further includes an encoder, a modulator and a digital-to-analog converter.

8. The modem of claim 1, wherein said receiving path of said modem further includes an decoder, a demodulator and a band-pass filter.

9. A method for detecting subscriber alerting signal (SAS) and CAS tones in a non-echo canceling voice band modem, said method comprising:

utilizing a shaping filter in a transmitting path of said modem to filter signals to be transmitted from said modem;

utilizing an analog-to-digital converter (ADC) in a receiving path of said modem to convert incoming signals; and coupling an echo canceler to said shaping filter and said ADC for cancelling echoes in signals from said shaping filter and said ADC before sending said modem signals to a SAS tone detector and a CAS tone detector, wherein said echo canceler includes a high-pass filter, a low-pass filter, an adaptive filter and a summing circuit; and utilizing said adaptive filter and said summing circuit in conjunction with said low-pass filter to provide a first error signal for said SAS tone detector when said modem is operating in an originate mode.

10. The method of claim 9, wherein said method further includes utilizing said first error signal to train said adaptive filter when said modem is operating in said originate mode.

11. The method of claim 9, wherein said method further includes utilizing said adaptive filter and said summing circuit in conjunction with said high-pass filter to provide a second error signal for said CAS tone detector when said modem is operating in an answer mode.

12. The method of claim 11, wherein said method further includes utilizing said second error signal to train said adaptive filter when said modem is operating in said answer mode.

13. The method of claim 9, wherein said low-pass filter has a cut-off frequency at approximately 1,700 Hz.

14. The method of claim 9, wherein said high-pass filter has a cut-off frequency at approximately 1,900 Hz.

15. The method of claim 9, wherein said transmitting path of said modem further includes an encoder, a modulator and a digital-to-analog converter.

16. The method of claim 9, wherein said receiving path of said modem further includes an decoder, a demodulator and a band-pass filter.

17. A computer program product residing on a computer usable medium for detecting subscriber alerting signal (SAS) and CAS tones in a non-echo canceling voice band modem, said computer program product comprising:

program code means for utilizing a shaping filter in a transmitting path of said modem to filter signals to be transmitted from said modem;

program code means for utilizing an analog-to-digital converter (ADC) in a receiving path of said modem to convert incoming signals;

program code means for coupling an echo canceler to said shaping filter and said ADC for cancelling echoes in modem signals from said shaping filter and said ADC before sending said modem signals to a SAS tone detector and a CAS tone detector, wherein said echo canceler includes a high-pass filter, a low-pass filter, an adaptive filter and a summing circuit; and program code means for utilizing said adaptive filter and said summing circuit in conjunction with said low-pass filter to provide a first error signal for said SAS tone detector when said modem is operating in an originate mode.

18. The computer program product of claim 17, wherein said computer program product further includes program code means for utilizing said first error signal to train said adaptive filter when said modem is operating in said originate mode.

19. The computer program product of claim 17, wherein said computer program product further includes program code means for utilizing said adaptive filter and said summing circuit in conjunction with said high-pass filter to provide a second error signal for said CAS tone detector when said modem is operating in an answer mode.

20. The computer program product of claim 19, wherein said computer program product further includes program code means for utilizing said second error signal to train said adaptive filter when said modem is operating in said answer mode.

21. The computer program product of claim 17, wherein said low-pass filter has a cut-off frequency at approximately 1,700 Hz.

22. The computer program product of claim 17, wherein said high-pass filter has a cut-off frequency at approximately 1,900 Hz.

23. The computer program product of claim 17, wherein said transmitting path of said modem further includes an encoder, a modulator and a digital-to-analog converter.

24. The computer program product of claim 17, wherein said receiving path of said modem further includes an decoder, a demodulator and a band-pass filter.

* * * * *